(No Model.)

A. J. ZIEGLER.
VETERINARY INSTRUMENT.

No. 486,153. Patented Nov. 15, 1892.

Witnesses
J. Ulke, Jr.

Inventor
Adam J. Ziegler.
By his Attorneys,
C. A. Snow & Co.

UNITED STATES PATENT OFFICE.

ADAM J. ZIEGLER, OF LINCOLN, ILLINOIS, ASSIGNOR OF ONE-HALF TO SAMUEL H. MARTIN, OF SAME PLACE.

VETERINARY INSTRUMENT.

SPECIFICATION forming part of Letters Patent No. 486,153, dated November 15, 1892.

Application filed July 18, 1892. Serial No. 440,347. (No model.)

*To all whom it may concern:*

Be it known that I, ADAM J. ZIEGLER, a citizen of the United States, residing at Lincoln, in the county of Logan and State of Illinois, have invented a new and useful Veterinary Instrument, of which the following is a specification.

My invention relates to a mouth-speculum for horses and other animals to be used to hold the mouth open to introduce medicine or to operate upon the mouth or throat; and the object of my improvement is to provide a simple, strong, and effective instrument which can be folded into a small portable shape when not in use.

Further objects of my invention will appear in the following description, and the novel features thereof will be particularly pointed out in the appended claims.

Figure 1:
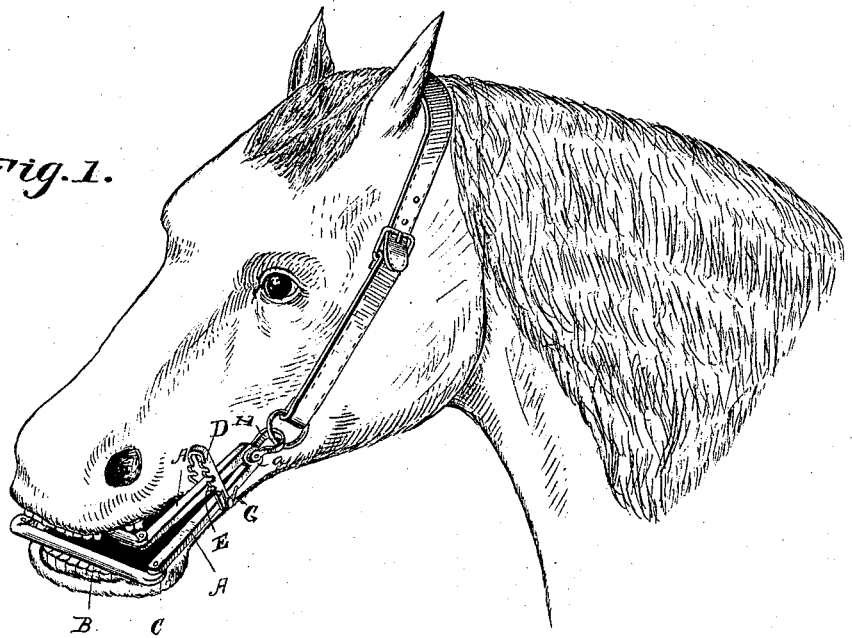
Figure 2:
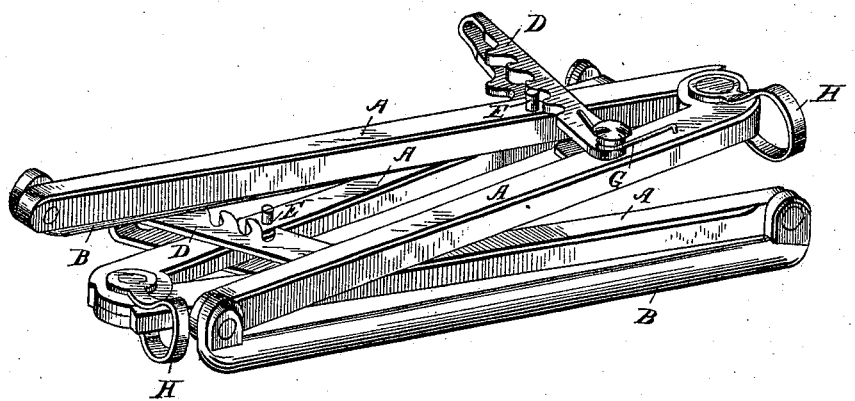

In the drawings, Figure 1 is a perspective view of a speculum embodying my invention. Fig. 2 is a similar view of the same folded.

The speculum comprises, essentially, the hinged side bars A A, connected in pairs by the hinged joints $a$ $a$, and the bit-rods B B, pivotally connected to the free ends of the side bars. The bit-rods are provided at their extremities with ears C C, arranged perpendicular to the length of the rods, whereby the pivotal points $c$ $c$ are offset from the bit-rods, and thus enable the side bars to be folded close to the bit-rods, as shown in Fig. 2. The side bars are locked and held at the desired deflection by the notched latches D D, one of which is attached to each side of the instrument. These latches are loop-shaped, their free ends being pivotally secured to opposite sides of one of the side bars and their closed ends forming guides for the other side bars, which are provided with lateral pins E E to engage the notches in the outer edges of the latches. Springs G G are attached to the latches to normally hold them in contact with the engaging pins E. Rings H H, pivotally connected to the hinged joints of the side bars, enable the speculum to be attached to the headstall to hold it in place.

The operation of instruments of this kind is well known and therefore needs no detailed description herein.

The advantage of the looped latches lies in the fact that they cannot be forced out of position to engage the pins. They are always in position to engage and hold the side bars in the adjusted position. Furthermore, the looped latches materially strengthen the device and add to its rigidity.

The advantage of being foldable, so that a veterinary surgeon may carry one conveniently in his pocket, will be readily seen.

Having thus described my invention, what I claim, and desire to secure by Letters Patent of the United States, is—

1. In a mouth-speculum for horses, the hinged side bars, the bit-rods connecting the free ends of the side bars, and loop-shaped latches pivotally connected to one of each pair of side bars and embracing the other of each pair, the latter being provided with pins to engage notches in said latches, substantially as specified.

2. In a mouth-speculum for horses, the hinged side bars, the bit-rods connecting the free ends of the side bars, the loop-shaped latches connecting said side bars and provided with notches, pins to engage said notches, and springs connected to the latches to normally hold them in contact with said pins, substantially as specified.

In testimony that I claim the foregoing as my own I have hereto affixed my signature in the presence of two witnesses.

ADAM J. ZIEGLER.

Witnesses:
F. R. PIERSON,
LAWRENCE B. STRINGER.